United States Patent
Kim et al.

(10) Patent No.: US 7,747,931 B2
(45) Date of Patent: Jun. 29, 2010

(54) APPARATUS AND METHOD FOR DECODING BURST IN AN OFDMA MOBILE COMMUNICATION SYSTEM

(75) Inventors: Han-Ju Kim, Seoul (KR); Young-Mo Gu, Suwon-si (KR); Dong-Woon Jung, Seoul (KR); Min-Goo Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 959 days.

(21) Appl. No.: 11/519,779

(22) Filed: Sep. 13, 2006

(65) Prior Publication Data

US 2007/0079215 A1 Apr. 5, 2007

(30) Foreign Application Priority Data

Sep. 14, 2005 (KR) .............. 10-2005-0085805
Nov. 22, 2005 (KR) .............. 10-2005-0112059

(51) Int. Cl.
*H03M 13/03* (2006.01)
(52) U.S. Cl. .............................. 714/786; 370/328
(58) Field of Classification Search .............. 714/786; 370/204, 328; 375/341
See application file for complete search history.

(56) References Cited

U.S. PATENT DOCUMENTS

| 5,909,434 A | 6/1999 | Odenwalder et al. |
| 6,181,714 B1 | 1/2001 | Isaksson et al. |
| 6,370,153 B1 | 4/2002 | Eng |
| 6,438,174 B1 | 8/2002 | Isaksson et al. |
| 2005/0068918 A1* | 3/2005 | Mantravadi et al. ......... 370/328 |
| 2006/0083336 A1* | 4/2006 | Zhang et al. ................ 375/341 |
| 2006/0171412 A1* | 8/2006 | Kanterakis .................. 370/464 |

* cited by examiner

*Primary Examiner*—Sam Rizk
(74) *Attorney, Agent, or Firm*—Roylance, Abrams, Berdo & Goodman, LLP

(57) ABSTRACT

A decoding apparatus in an Orthogonal Frequency Division Multiple Access (OFDMA) mobile communication system is provided. In the apparatus comprises, a first combiner performs first combining on an input burst a first number of times. A deinterleaver deinterleaves an output of the first combiner and outputs a burst having a repeated structure. A second combiner performs second combining on the burst having the repeated structure a second number of times. A decoder decodes the combined burst. A signal detector stores a second internal memory state value of the decoder for an instance where a first decoded bit is extracted from the decoded data, stores a second internal memory state value of the decoder for an instance where a last decoded bit is extracted from the decoded data, compares the first and second stored internal memory state values of the decoder, and sets a burst quality indicator (BQI) according to the comparison result.

27 Claims, 15 Drawing Sheets

APPARATUS AND METHOD FOR DECODING BURST IN AN OFDMA MOBILE COMMUNICATION SYSTEM

CROSS-REFERENCE TO RELATED APPLICATIONS

This application claims the benefit under 35 U.S.C. §119 (a) of Korean Patent Application Serial No. 2005-85805, filed in the Korean Intellectual Property Office on Sep. 14, 2005, and of Korean Patent Application Serial No. 2005-112059, filed in the Korean Intellectual Property Office on Nov. 22, 2005, the entire disclosures of both of which are hereby incorporated by reference.

BACKGROUND OF THE INVENTION

1. Field of the Invention

The present invention relates generally to an apparatus and method for decoding bursts in a mobile communication system. More particularly, the present invention relates to an apparatus and method for decoding bursts in an OFDMA mobile communication system.

2. Description of the Related Art

Generally, in a Wireless Local Area Network (WLAN), a terminal, due to its short range, decreases in performance while on the move or if it goes away from an access point (AP). The wireless Internet based on the 3rd generation (3G) mobile communication system, though it does not have the problems of the WLAN, has a high cost. Wireless Broadband Internet (WiBro), also known as Portable Internet, allows a user to enjoy a high-speed Internet connection any place and any time while on the move, like a mobile phone. WiBro is an intermediate between the wireless Internet and the WLAN, uses a frequency band of 2.3 GHz, and has a transfer speed (i.e. service bandwidth) of about 1 Mbps. The WiBro system is an Orthogonal Frequency Division Multiple Access (OFDMA) mobile communication system based on IEEE 802.16e.

FIG. 1 illustrates a network architecture in the typical OFDMA mobile communication system.

Referring to FIG. 1, the OFDMA mobile communication system includes a Portable Subscriber Station (PSS) 102 serving as a terminal, a Radio Access Station (RAS) 104 serving as a base station (or AP), an Access Control Router (ACR) 106 serving as a base station controller, a Home Agent (HA) 108, and an Authentication, Authorization and Accounting (AAA) server 110. The PSS 102 is an apparatus used by a subscriber to receive portable Internet service. The RAS 104 exchanges data with the PSS 102 via a wireless interface at an end of a wire network, and the ACR 106 controls the PSS 102 and the RAS 104, and routes IP packets. The HA 108 supports IP mobility of the terminal in the home network, and the AAA server 110 permits an access to the portable Internet only for the authorized user, and performs authentication, authorization and accounting on users and devices to provide the portable Internet service. A provider IP network 112 connects the ACR 106 to the HA 108, the AAA server 110 and a common IP network 114.

FIG. 2 illustrates an exemplary frame structure of an OFDMA system using Time Division Duplexing (TDD). It can be seen that a downlink (DL) interval and an uplink (UL) interval are separated in a time domain. A first symbol of a downlink frame is a preamble. A terminal performs synchronization acquisition, Base Station ID acquisition, and channel estimation using the preamble. Because the Base Station ID is used as a seed value for scrambling and subcarrier permutation, the Base Station ID acquisition is necessary to decode DL data bursts. The preamble is followed by a Frame Control Header (FCH) 200, and the FCH 200 includes therein the information necessary for DL-MAP decoding. That is, the FCH 200 contains information on a DL-MAP length and a coding scheme of a DL-MAP. The DL-MAP includes therein the information necessary for DL data burst decoding of the current frame. The included information includes position and size information of each individual burst, and Modulation and Coding Scheme (MCS) information of bursts. Uplink transmission starts from a control symbol, and a guard time used for reducing uplink/downlink transmission time is inserted between the downlink and the uplink at the middle and end of an uplink frame. An IEEE 802.16e-based OFDMA terminal performs a reception process in the manner of measuring a preamble received from the downlink, decoding an FCH burst, performing DL-MAP decoding using DL-MAP information in the decoding result, and decoding general data bursts.

In the OFDMA mobile communication system, an FCH burst is composed of 24-bit information. The 24-bit data constituting the FCH burst is defined by the Medium Access Control (MAC) standard, and includes 8 bits for length information of a DL-MAP, 2 bits for DL-MAP repetition type information, 10 bits for other frame information, and 4 reserved bits, for the currently transmitted frame. According to the 802.16e standard, the 4 reserved bits in the FCH information are fixed to '0'.

A coding/decoding process of the FCH burst will be described hereinbelow with reference to FIGS. 3A and 3B. FIGS. 3A and 3B are block diagrams for a description of a coding/decoding process of an FCH burst in a transceiver of a general OFDMA mobile communication system.

Referring to FIG. 3A, 24-bit data to be transmitted from a transmission apparatus to a reception apparatus in the OFDMA mobile communication system is input to a duplicater unit 310. The duplicater unit 310 repeats the 24-bit data twice, and outputs 48-bit data. The reason why the duplicater unit 310 repeats the 24-bit data twice is to match the input bits to 48 bits which are the minimum coding unit in the OFDMA mobile communication system.

The 48-bit data is input to a convolutional coder 320. The convolutional coder 320, having a coding rate of ½, encodes the 48-bit input data and outputs a 96-bit codeword. The 96-bit codeword output from the convolutional coder 320 is input to an interleaver 330 that prevents burst errors. The interleaver 330 interleaves the 96-bit codeword, and outputs the interleaved 96-bit codeword to a repeater 340. The repeater 340 repeats the 96-bit codeword 4 times, and delivers the repeated codeword to a mapper (not shown). The mapper refers to a modulator, and uses one of Quadrature Phase Shift Keying (QPSK), 8-ary Phase Shift Keying (8PSK), 16-ary Quadrature Amplitude Modulation (16QAM), and 64-ary Quadrature Amplitude Modulation (64QAM) according to bit rate. The QPSK modulation scheme is applied to the FCH burst.

Generally, the convolutional coder 320 is a typical channel coder for error correction. The convolutional coder 320 uses a method of defining a mutual relation expression using several bits located before the current bit, and generating a new bit pattern depending on the relation expression. Thus, even though a certain bit suffers an error during transmission, the convolutional decoder 320 detects the defective bit by checking its preceding/following bits, and corrects the detected defective bit. The convolutional coder 320 becomes either a rate-½ convolutional coder or a rate-⅓ convolutional coder according to how many coded bits it outputs for one original input signal bit in generating a new bit pattern. That is, the convolutional coder 320 is called a rate-½ convolutional coder if it outputs 2 coded bits for one input bit, and called a rate-⅓ convolutional coder if it outputs 3 coded bits for one input bit.

FIG. 4 illustrates an exemplary simplified structure of a convolutional coder applied to an OFDMA mobile communication system.

As illustrated in FIG. 4, input bits are sequentially input to 6 cascaded registers 410 to 460 bit by bit on a shift basis at every clock. A first adder 470 adds up an input bit of the first register 410, an output bit of the first register 410, an output bit of the second register 420, an output bit of the third register 430, and an output bit of the last register 460, and outputs a coded bit stream X; A second adder 480 adds up an input bit of the first register 410, an output bit of the second register 420, an output bit of the third register 430, an output bit of the fifth register 450, and an output bit of the last register 460, and generates a coded bit stream Y. Each of the first and second adders 470 and 480, after adding up its inputs, performs a modulo-2 operation on the added value, and outputs a 1-bit result.

Assume that a value of an initial register is '00' and data '11010' is input to a rate-½ convolutional coder. In this case, if the first bit '1' is input, the register output '11', and changes its value to '10'. If the next bit '1' is input, the register outputs '01', and changes its value again to '11'. By repeating this process, the rate-½ convolutional coder outputs output data '1101010010'.

Referring to FIG. 3B, in the reception apparatus, 384 Log Likelihood Ratio (LLR) values for an FCH burst output from a demapper (or demodulator) are input to a combiner 350. The combiner 350 outputs 96 LLR values through 4 combining operations. The 96 LLR values are input to a deinterleaver 360. The deinterleaver 360 deinterleaves the 96 LLR values, and outputs the deinterleaved LLR values to a Viterbi decoder 370. The Viterbi decoder 370 decodes the 96 LLR values, and outputs 48-bit decoded data.

FIG. 5 illustrates an exemplary data structure decoded by a receiver in the general OFDMA mobile communication system.

The 48-bit data decoded by the Viterbi decoder 370 is shown by reference numeral 501, and the 48-bit data that the duplicater unit 310 outputs after repeating 24-bit data twice is shown by reference numerals 502 and 503. The decoded data output from the Viterbi decoder 370 has a twice-repeated (doubled) structure, like the 48-bit data output from the duplicater unit 310.

The FCH burst decoding apparatus having the above repetition structure has a long decoding time, causing an increase in output time of a result value. Because the decoding apparatus has a structure in which the decoding result of the FCH burst is repeated, it cannot obtain performance gain to which additional possible combining is applied.

In addition, a Burst Quality Indicator (BQI) indicating the quality of an FCH burst is not included in the 24-bit FCH information. The BQI means a specific bit based on which after a decoding process of a burst, it can be determined whether decoding of the burst is successful. In a general case, a CRC bit is popularly used as the BQI bit. However, it is not possible to measure the BQI using the coding structure of the FCH burst. That is, the decoded data is obtained by repeating 24-bit data twice as stated in the coding process. Therefore, the BQI is obtained by comparing the repeated 24-bit decoded data. If the comparison result indicates 'consistency', it is considered that the FCH burst has undergone successful decoding, and thus has a high quality. However, if the comparison result indicates 'inconsistency', it is considered that the FCH burst has failed to undergo successful decoding, and thus has a low quality. The BQI can have a multi-level value, and it is assumed that the BQI has a higher value as the quality is higher. In the OFDMA terminal, after FCH decoding, a quality value is reported to an upper layer, and the upper layer performs an upper algorithm depending on the quality value.

The foregoing method can contribute to performance improvement of the FCH burst and obtain an improved BQI. However, about 50% of the FCH burst is determined to be normal, even though it is actually defective. If the defective FCH burst is determined as a normal FCH burst, the terminal performs decoding on a DL-MAP based on the defective FCH burst. Actually, a CRC bit, which is a BQI bit, is inserted in the DL-MAP. Therefore, if the FCH burst has an error, it is possible to detect occurrence of an error depending on the BQI bit in the DL-MAP. However, the terminal unnecessarily performs the DL-MAP decoding process. In particular, if an error has occurred in DL-MAP length and repetition type information corresponding to DL-MAP information in the FCH burst information, the time and power required for the wrong DL-MAP decoding process greatly increases. For example, an 8-bit value for the DL-MAP length is transmitted as a value of 10. In this case, if the 8th bit, or the Most Significant Byte (MSB), suffers a transmission error from '0' to '1', the DL-MAP length becomes 138, increasing 14 times the time and power required for decoding the information. In addition, when a DL-MAP decoding error occurs, it is not possible to determine whether there is an error in a DL-MAP reception process or in an FCH reception process.

Accordingly, there is a need for an improved apparatus and method for decoding a burst in an OFDMA system.

SUMMARY OF THE INVENTION

Exemplary embodiments of the present invention address at least the above problems and/or disadvantages and provide at least the advantages described below. It is, therefore, an exemplary object of the present invention to provide a burst decoding apparatus and method for reducing a decoding time in an FCH burst decoding process in an OFDMA mobile communication system.

It is another exemplary object of the present invention to provide a burst decoding apparatus and method for improving decoding performance for an FCH burst in an OFDMA mobile communication system.

It is further another exemplary object of the present invention to provide a burst decoding apparatus and method for obtaining a performance gain of an FCH burst through combining using a structure of the FCH burst in an OFDMA mobile communication system.

It is yet another exemplary object of the present invention to provide a burst decoding apparatus and method for obtaining a BQI value while obtaining an additional performance gain of an FCH burst compared with the conventional decoding scheme, using a structure of a convolutional coder applied to an FCH burst, in an OFDMA mobile communication system.

It is still another exemplary object of the present invention to provide a burst decoding apparatus and method for increasing accuracy of a BQI value for an FCH burst decoding result using a specific bit pattern in an OFDMA mobile communication system.

It is still another exemplary object of the present invention to provide a burst decoding apparatus and method for allowing a terminal to avoid an unnecessary DL-MAP decoding process in an OFDMA mobile communication system.

According to one exemplary aspect of the present invention, there is provided a decoding apparatus in an Orthogonal Frequency Division Multiple Access (OFDMA) mobile communication system. The apparatus comprises a first combiner for performing first combining on an input burst a number of times, a deinterleaver for deinterleaving an output of the first combiner and outputting a burst having a repeated structure, a second combiner for performing second combining on the burst having the repeated structure a number of times and a decoder for decoding the combined burst.

According to another exemplary aspect of the present invention, there is provided a decoding apparatus in an Orthogonal Frequency Division Multiple Access (OFDMA) mobile communication system. The apparatus comprises a first combiner for performing first combining on an input burst a number of times, a deinterleaver for deinterleaving an output of the first combiner and outputting a burst having a repeated structure, a second combiner for performing second combining on the burst having the repeated structure a number of times, a decoder for decoding the combined burst and a signal detector for storing an internal memory state value of the decoder for an instance where a first decoded bit is extracted from the decoded data, storing an internal memory state value of the decoder for an instance where a last decoded bit is extracted from the decoded data, comparing the stored internal memory state values of the decoder, and setting a burst quality indicator (BQI) according to the comparison result.

According to further another exemplary aspect of the present invention, there is provided a decoding method in an Orthogonal Frequency Division Multiple Access (OFDMA) mobile communication system. The method comprises performing first combining on an input burst a number of times, deinterleaving the first-combined burst and outputting a burst having a repeated structure, performing second combining on the burst having the repeated structure a number of times and decoding the second-combined burst.

According to yet another exemplary aspect of the present invention, there is provided a decoding method in an Orthogonal Frequency Division Multiple Access (OFDMA) mobile communication system. The method comprises performing first combining on an input burst a number of times, deinterleaving the first-combined burst and outputting a burst having a repeated structure, performing second combining on the burst having the repeated structure a number of times, decoding the second-combined burst, storing an internal memory state value of a decoder for an instance where a first decoded bit is extracted from the decoded data, storing an internal memory state value of the decoder for an instance where a last decoded bit is extracted from the decoded data, comparing the stored internal memory state values of the decoder and setting a burst quality indicator (BQI) according to the comparison result.

BRIEF DESCRIPTION OF THE DRAWINGS

The above and other objects, features and advantages of exemplary embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described in detail with reference to the annexed drawings.

An exemplary embodiment of the present invention proposes a method for performing combining once again using an FCH repetition characteristic to improve FCH decoding performance.

Another exemplary embodiment of the present invention proposes a method for comparing a decoder's internal memory state selected during decoding of the first bit with a decoder's internal memory state selected during decoding of the last bit using an FCH repetition characteristic and the characteristic applied to the decoder having a circular state, and setting a Burst Quality Indicator (BQI) according to the comparison result, thereby preventing unnecessary decoding and improving FCH decoding performance.

Figure 6A:
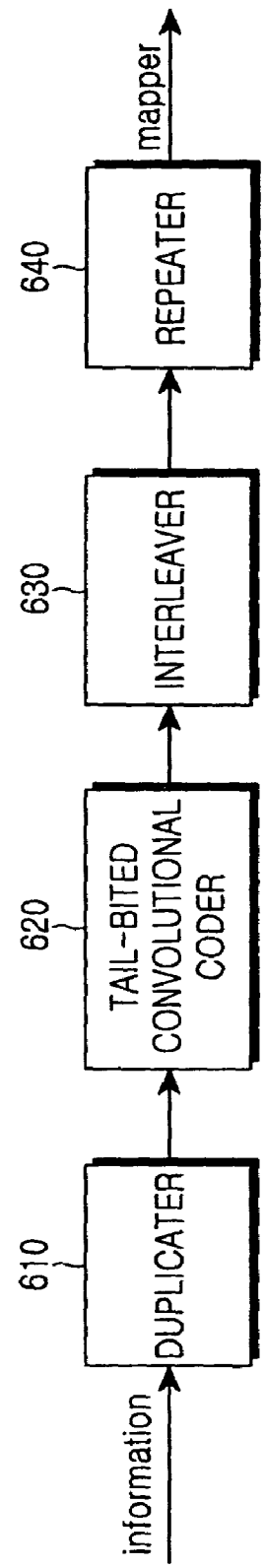
FIGS. 6A and 6B are block diagrams for a description of a coding/decoding process for an FCH burst in a transceiver for an OFDMA mobile communication system according to an exemplary embodiment of the present invention.
Figure 6B:
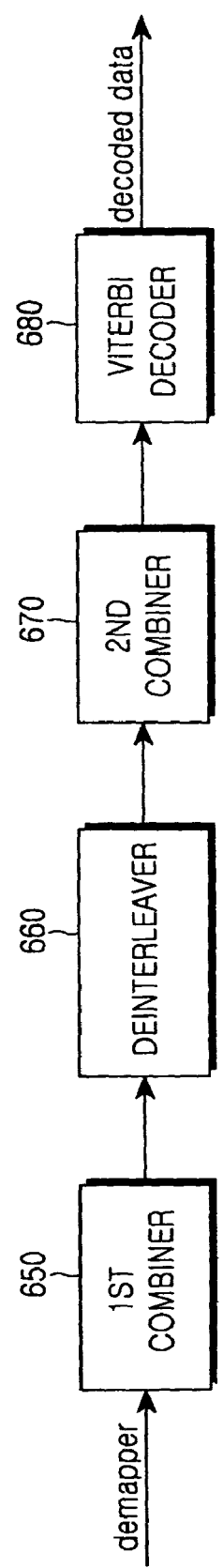
Figure 6C:
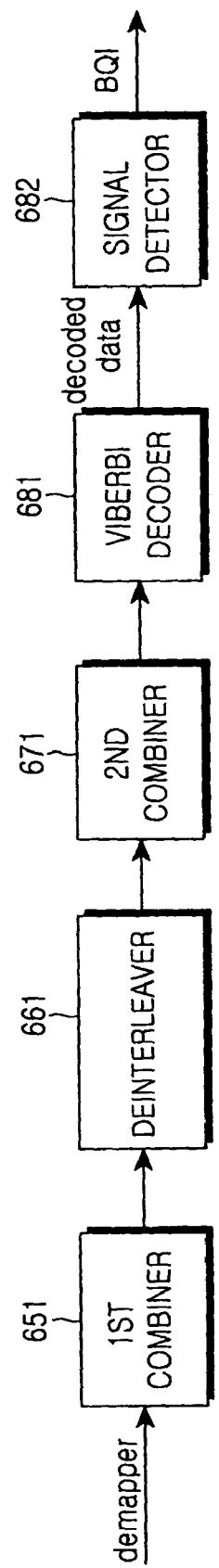
FIG. 6C is a block diagram for a description of a decoding process for an FCH burst in a receiver for an OFDMA mobile communication system according to another exemplary embodiment of the present invention.

With reference to FIGS. 6A to 6C, a description will now be made of a coding/decoding process for an FCH burst in an OFDMA mobile communication system according to an exemplary embodiment of the present invention. FIGS. 6A and 6B are block diagrams for a description of a coding/decoding process for an FCH burst in a transceiver for an OFDMA mobile communication system according to an exemplary embodiment of the present invention.

Figure 1:
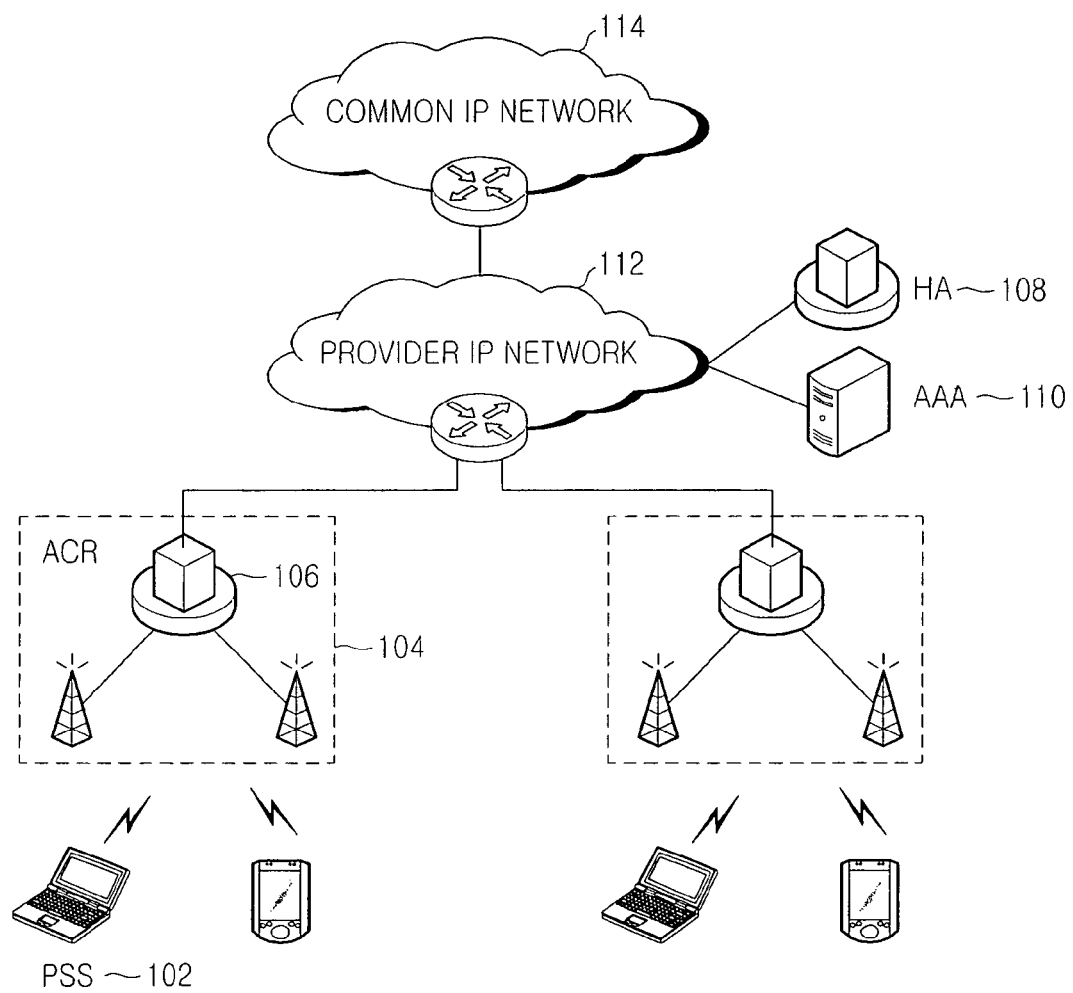
FIG. 1 is a block diagram of a general OFDMA mobile communication system.
Figure 2:
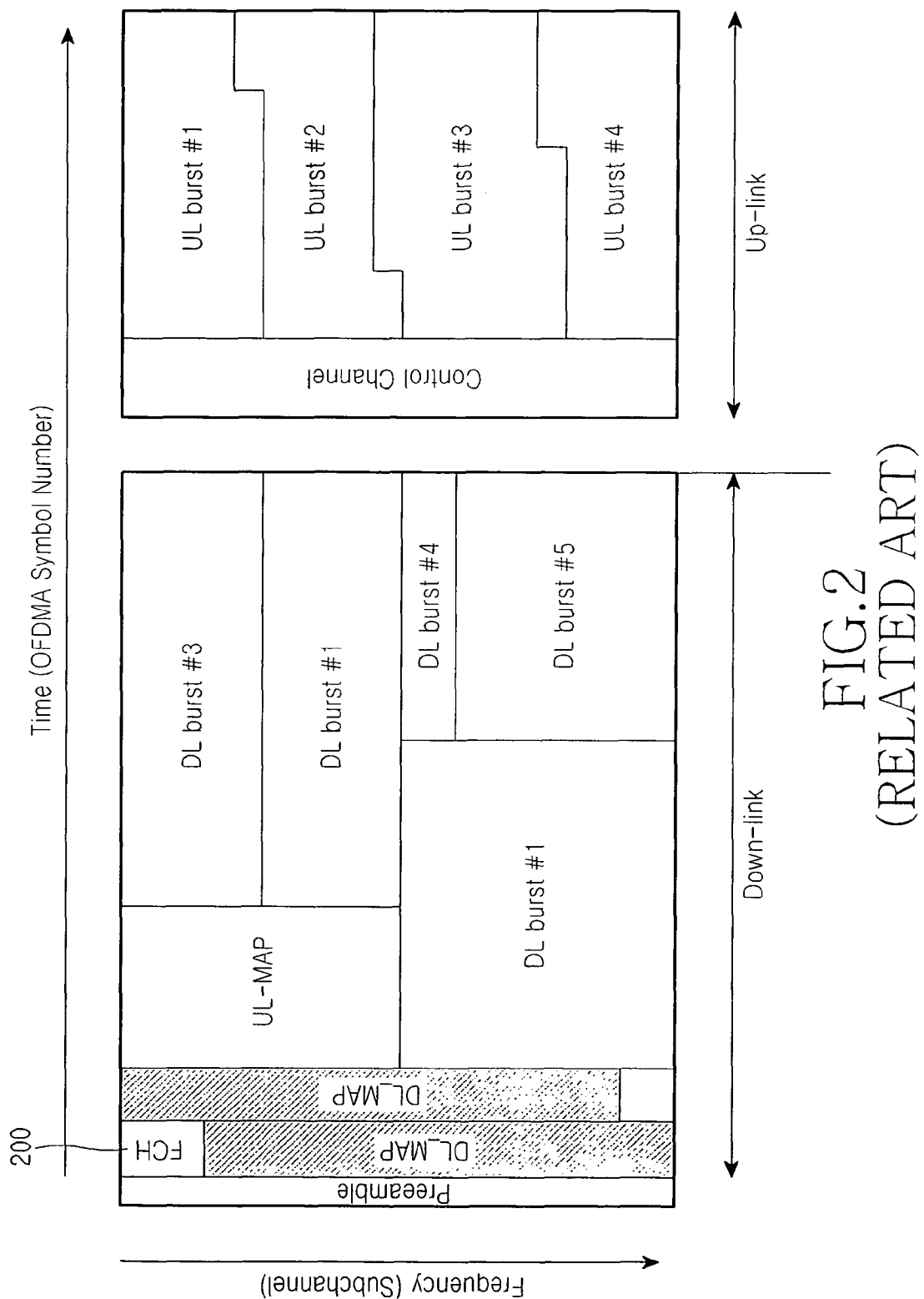
FIG. 2 is a diagram illustrating an exemplary frame structure of an OFDMA system using Time Division Duplexing (TDD)
Figure 3A:
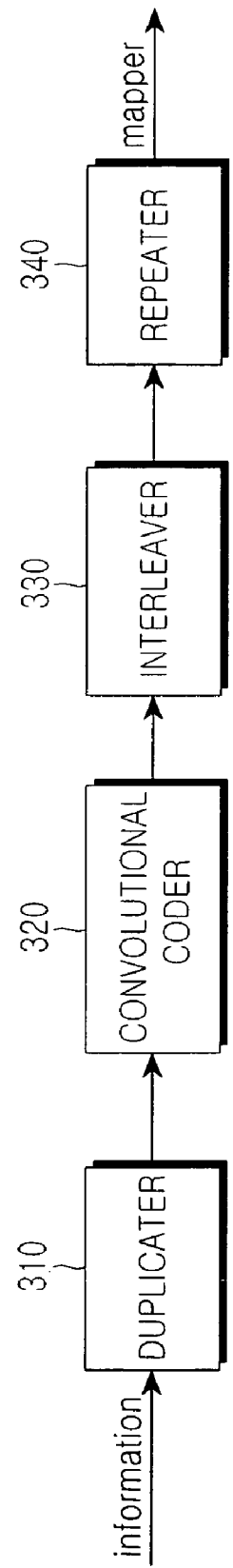
FIGS. 3A and 3B are block diagrams for a description of a coding/decoding process of an FCH burst in a transceiver of a general OFDMA mobile communication system.
Figure 3B:
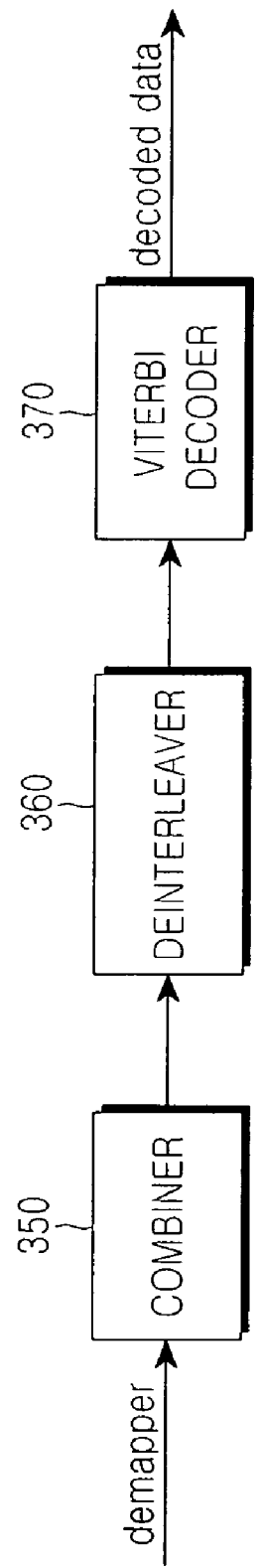

A transmitter of the OFDMA mobile communication system according to an exemplary embodiment of the present invention, as illustrated in FIG. 6A, uses a tail-bited convolutional coder 620 instead of the convolutional coder 320 of FIG. 3A. In addition, a receiver of the OFDMA mobile communication system according to an exemplary embodiment of the present invention, as illustrated in FIG. 6B, uses a second combiner 670 between the deinterleaver 360 and the Viterbi decoder 370 of FIG. 3B. The elements shown in FIG. 6A, for example interleaver 630 and repeater 640, are similar to those discussed with reference to FIG. 3A.

Further, in a receiver according to another exemplary embodiment of the present invention, a signal detector 682 is added to an output of the Viterbi decoder 680 of FIG. 6B as illustrated in FIG. 6C.

A description will first be made of the tail-bited convolutional coder 620 applied to an OFDMA mobile communication system according to an exemplary embodiment of the present invention. The tail-bited convolutional coder 620, as shown in FIG. 6A, uses a coding method using tail bits.

Figure 4:
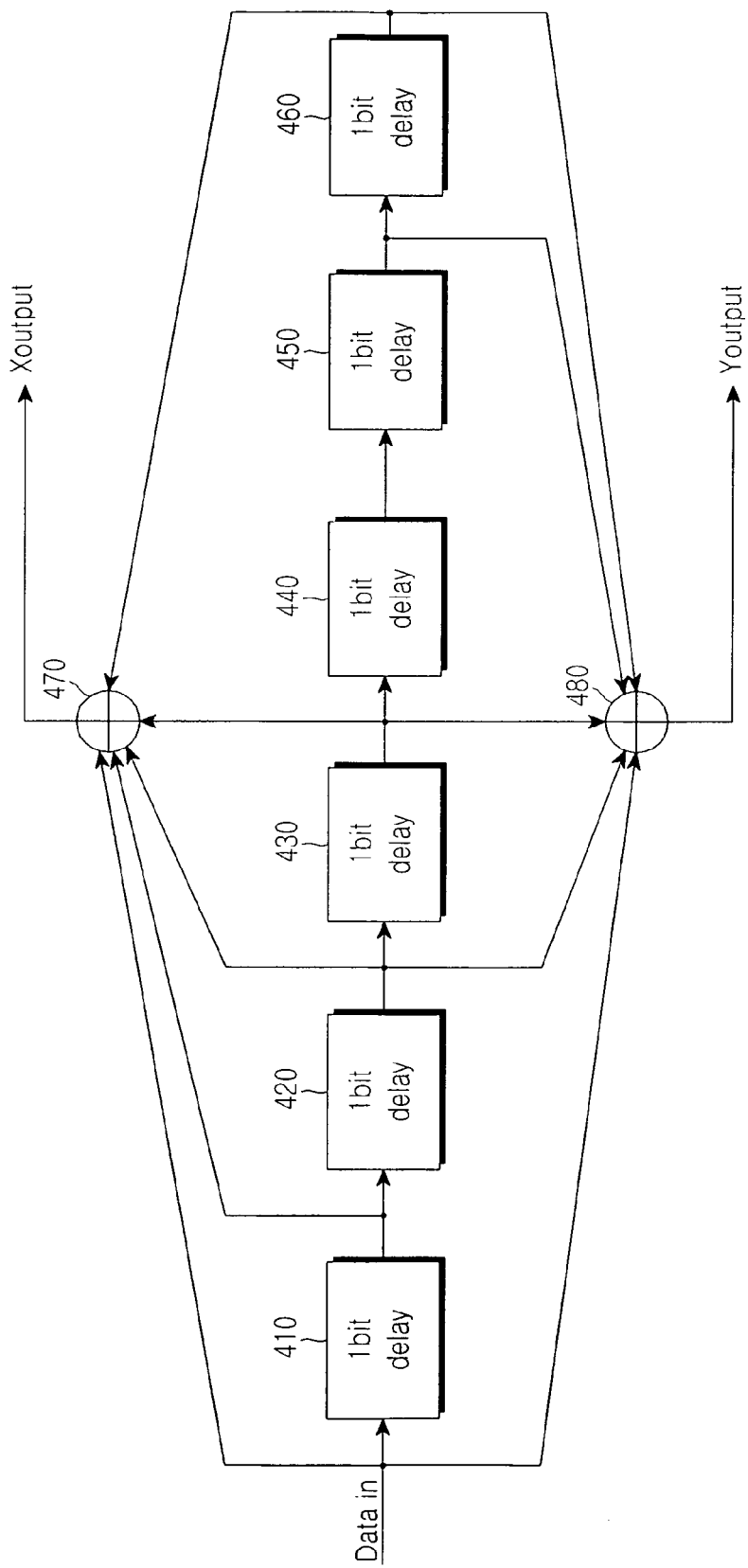
FIG. 4 is a block diagram of a general convolutional coder.
Figure 5:
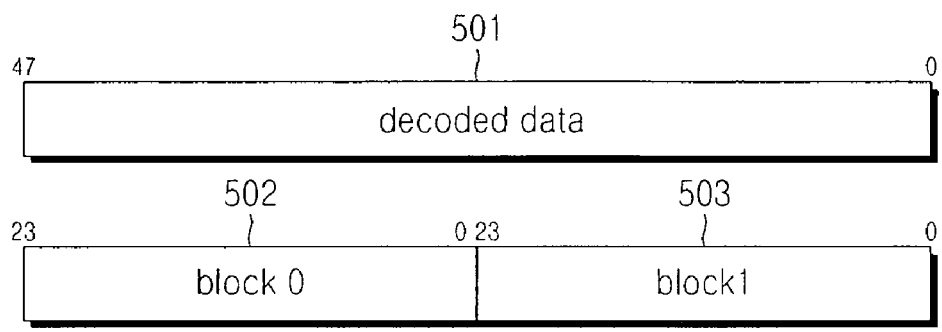
FIG. 5 is a diagram illustrating an exemplary data structure decoded by a receiver in the general OFDMA mobile communication system.

The general convolutional coder facilitates decoding of coded bits by matching memory states of the registers 410 to 460 of FIG. 4 before and after coding. The cascaded registers 410 to 460 are all initialized to '0' before coding. When N input bits $b_0, b_1, b_2, \ldots b_{N-1}$ are sequentially input to the registers 410 to 460 on a shift basis, the adders 470 and 480 output coded bits. After the last bit $b_{N-1}$ is input, as many tail bits as the number of registers are sequentially input to the registers 410 to 460. As a result, the final memory state becomes '0', like the initial memory state. That is, the tail bits are determined such that the final memory state should be equal to the initial memory state. This method is called a zero-padding coding method, and is used as a general convolutional coding method.

However, because the tail bits contain no information, the tail-bited coding reduces a bit rate by the number of the tail bits. In order to solve this problem, the OFDMA mobile communication system uses tail-bited coding for matching the final memory state to the initial memory state using input data. This tail-bited coding initializes the decoder's memory states using input bits such that the final memory state should be equal to the initial memory state. With the use of the tail-bited coding, it is possible to generate a degradation-free convolutional code, without a bit rate loss due to the tail bits.

In the convolutional coder, the tail-bited coding can be simply implemented by initializing the memory states with the last (K−1) bits (where K denotes a constraint length) of an information block to be coded.

Figure 7:
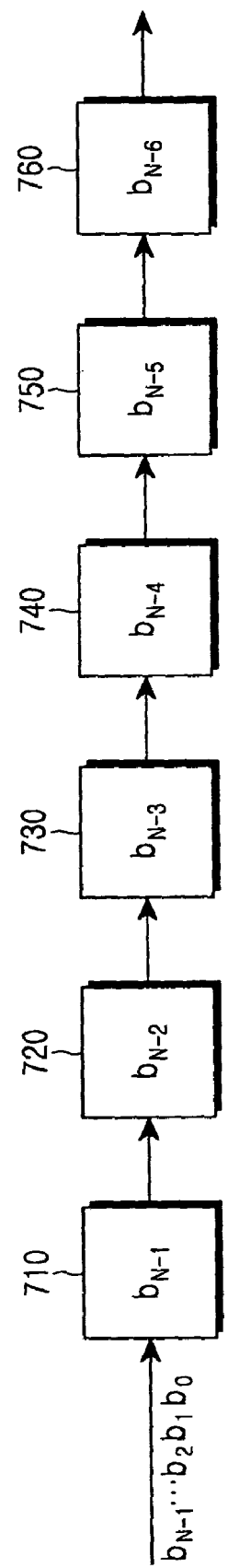
FIG. 7 is a diagram for a description of a memory initialization process for a tail-bited convolutional coder according to an exemplary embodiment of the present invention.

FIG. 7 is a diagram for a description of a memory initialization process for a tail-bited convolutional coder according to an exemplary embodiment of the present invention. As illustrated in FIG. 7, if there is given an information block composed of N input bits $b_0, b_1, b_2, \ldots b_{N-1}$, then 6 cascaded registers 710 to 760 are initialized to $b_{N-1}, b_{N-2}, b_{N-3}, b_{N-4}, b_{N-5}, b_{N-6}$, respectively, before coding. The N input bits are sequentially input to the registers 710 to 760 on a shift basis. Thereafter, addition is performed by the adders shown in FIG. 4, and after the last bit $b_{N-1}$ is input, the final memory state is equal to the initial memory state. Therefore, in order to allow the initial state and the final state to have the same state, the convolutional coder initializes its memory states to $b_{N-1}, b_{N-2}, b_{N-3}, b_{N-4}, b_{N-5}, b_{N-6}$ before a value of the bit $b_0$ is input thereto, thereby having a circular state.

Figure 8:
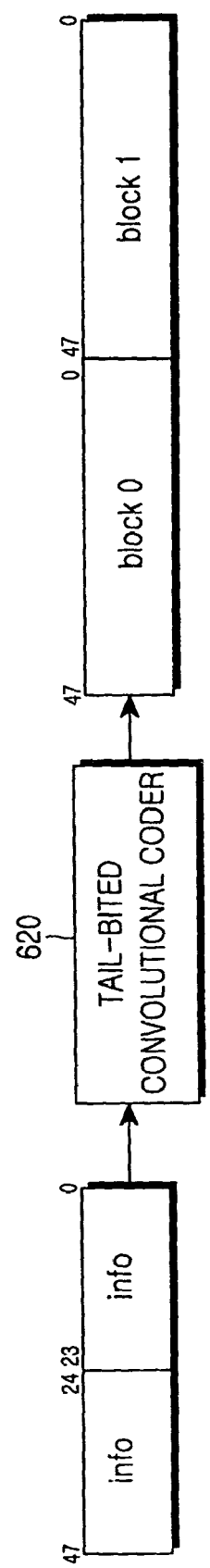
FIG. 8 is a diagram illustrating an input/output of a tail-bited convolutional coder for an FCH burst in an OFDMA mobile communication system according to an exemplary embodiment of the present invention.

An input/output of the tail-bited convolutional coder for an FCH burst is shown in FIG. 8. FIG. 8 is a diagram illustrating an input/output of a tail-bited convolutional coder for an FCH burst in an OFDMA mobile communication system according to an exemplary embodiment of the present invention. As mentioned above, for the FCH burst, 24-bit information is repeated twice in the duplicater unit 610 of FIG. 6A, and the resulting 48 bits are input to the tail-bited convolutional coder 620, and the tail-bited convolutional coder 620 outputs a 96-bit codeword. The 96-bit codeword, as it undergoes tail-bited convolutional coding, has a structure in which a 48-bit codeword is repeated twice.

An operation of the receiver in the OFDMA mobile communication system according to an exemplary embodiment of the present invention will now be described with reference to FIG. 6B.

Referring to FIG. 6B, a 384-bit LLR value, which is a demapper's output transmitted from the transmitter in the OFDMA mobile communication system, is input to a first combiner 650. The first combiner 650 combines the 384-bit LLR value four times in units of 96 bits. The 96-bit LLR value output from the first combiner 650 is input to a deinterleaver 660. The deinterleaver 660 deinterleaves the 96-bit LLR value, and outputs the deinterleaved 96-bit LLR value. The 96-bit LLR value output from the deinterleaver 660 has a structure in which a 48-bit LLR is repeated twice. Because the LLR is repeated, if the 96-bit LLR is input to a second combiner 670, the second combiner 670 combines the 96-bit LLR value twice in units of 48 bits, and outputs the resulting value to the Viterbi decoder 680. The Viterbi decoder 680 outputs 24-bit decoded data from the twice combined 48-bit LLR value.

That is, in the decoding process of the OFDMA terminal, the 96-bit LLR value output from the deinterleaver 660 has a structure in which a 48-bit LLR is repeated. Because the LLR is repeated, a performance gain can be obtained by combining the 96-bit LLR in units of 48 bits. Generally, the performance gain obtainable by one combining is about SNR 3 dB. In this case, the Viterbi decoder 680 receives the combined 48-bit LLR and outputs 24-bit decoded data.

Figure 9:
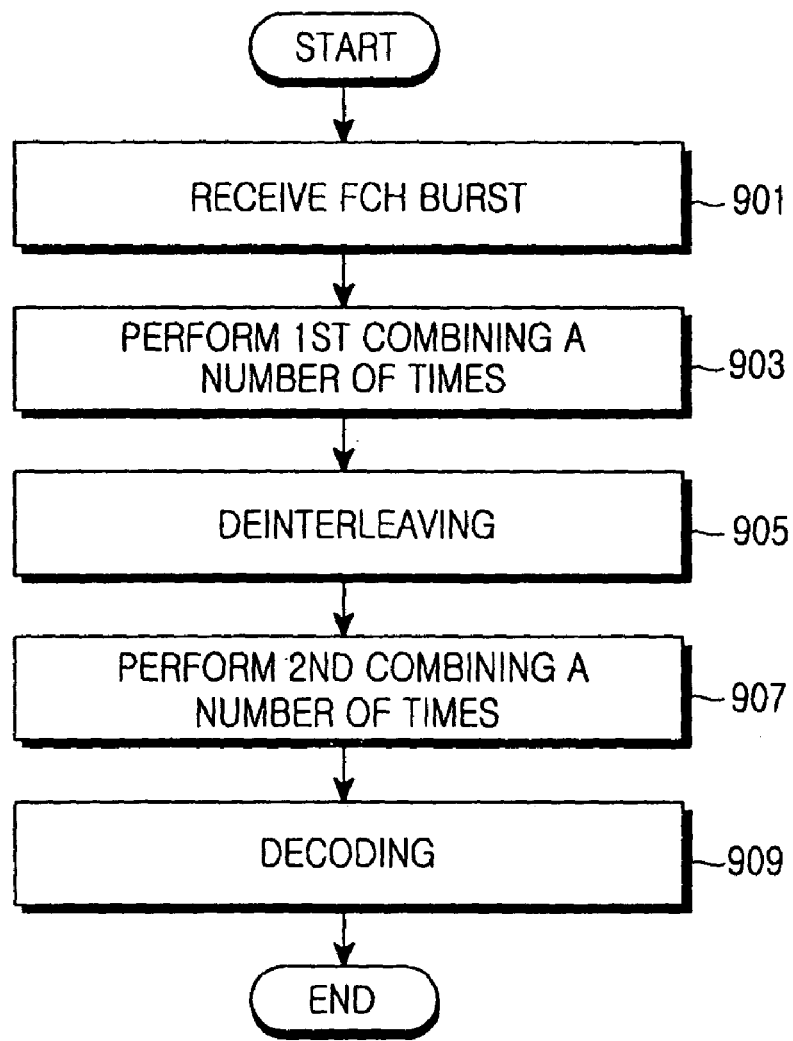
FIG. 9 is a flowchart for a description of an FCH burst decoding method in an OFDMA mobile communication system according to an exemplary embodiment of the present invention.

An FCH burst decoding method according to an exemplary embodiment of the present invention will now be described with reference to FIG. 9. FIG. 9 is a flowchart for a description of an FCH burst decoding method according to an exemplary embodiment of the present invention.

Referring to FIG. 9, in step 901, a first combiner 650 receives an FCH burst, in other words, a 384-bit LLR value output from a demapper. In step 903, the first combiner 650 combines the 384-bit LLR value in units of 96 bits four times, and outputs the resulting 96-bit LLR value to a deinterleaver 660. This combining will be referred to as 'first combining'. In step 905, the deinterleaver 660 deinterleaves the 96-bit LLR value, and outputs the deinterleaved 96-bit LLR value. The deinterleaved 96-bit LLR value output from the deinterleaver 660 has a structure in which a 48-bit LLR is repeated twice. Upon receipt of the 96-bit LLR, a second combiner 670 combines the 96-bit LLR value in units of 48 bits twice, and outputs the resulting value to a Viterbi decoder 680 in step 907. This combining will be referred to as 'second combining'. In step 909, the Viterbi decoder 680 decodes the twice combined 48-bit LLR value and outputs 24-bit decoded data.

Figure 10:
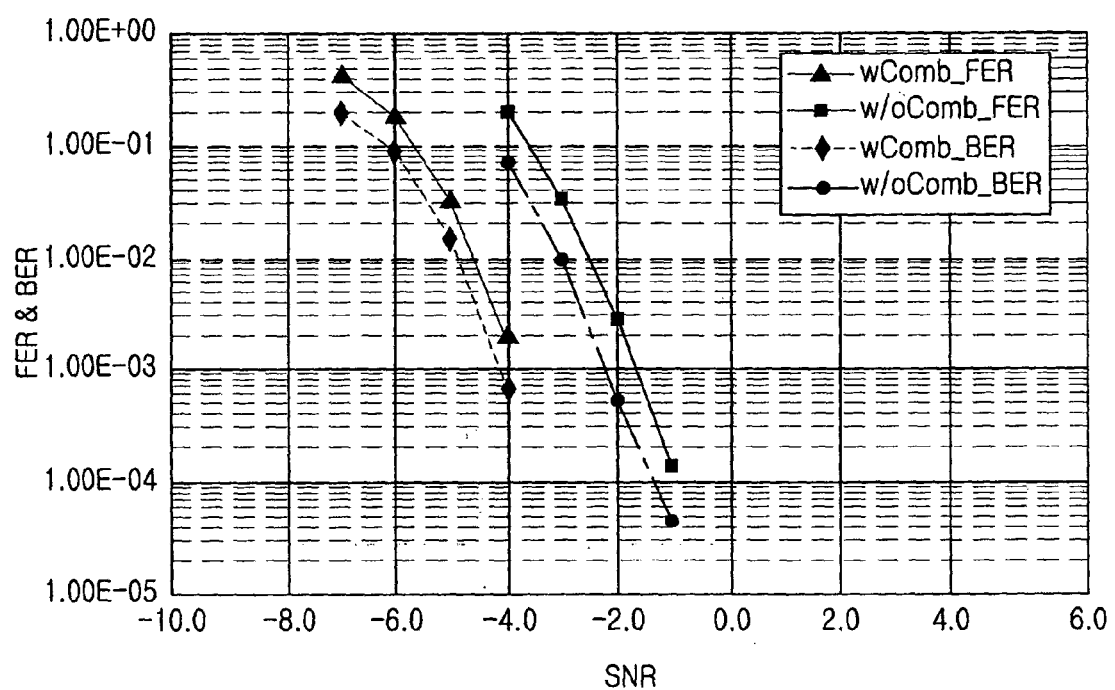
FIGS. 10 and 11 are diagrams illustrating a performance comparison between an FCH burst decoding method and the conventional decoding method in an OFDMA mobile communication system according to an exemplary embodiment of the present invention.
Figure 11:
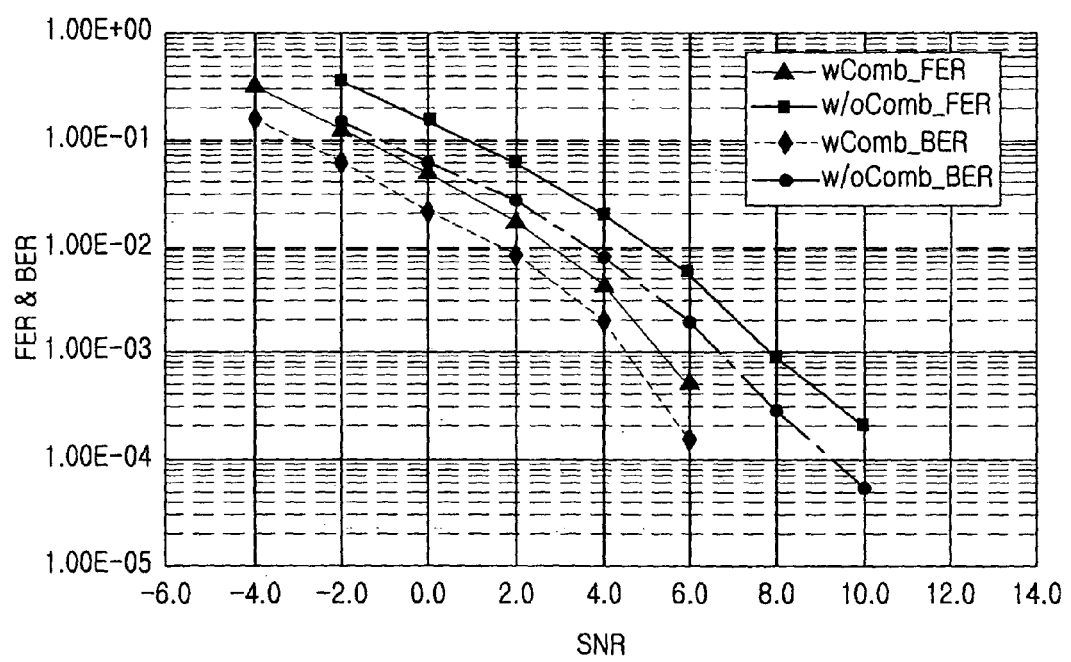

FIGS. 10 and 11 illustrate a frame error rate (FER) and a bit error rate (BER) measured under an AWGN environment and a fading environment (VecA, 60 km/h) by the conventional FCH burst decoding apparatus and method and the FCH burst decoding apparatus and method proposed by an exemplary embodiment of the present invention to verify the effect of an exemplary embodiment of the present invention.

In FIGS. 10 and 11, wComb indicates the decoding result of the decoding apparatus and method proposed by exemplary embodiments of the present invention, to which the LLR combining is added, and w/oComb indicates the decoding result of the conventional decoding apparatus and method to which the LLR combining is not added.

It can be noted from FIGS. 10 and 11 that the present invention can obtain a performance gain of SNR 2.0 dB or higher (based on $10^{-2}$ FER) under the AWGN environment and obtain a performance gain of SNR 2.0 dB or higher even under the fading environment.

The Viterbi decoder 680 extracts a BQI by checking a circular state in the decoding process. Because the BQI is coded such that a memory state in the tail-bited convolutional coder 620 becomes a circular state, the BQI can be obtained by detecting the circular state in the decoding process of the Viterbi decoder 680. A high-BQI instance can be divided into one instance in which the decoder incidentally has the circular state even though the channel state is bad, and another instance in which the decoder has the circular state as it has succeeded in decoding. Table 1 and Table 2 below show an accuracy of detecting the circular state, obtained through the simulations of FIGS. 10 and 11, respectively. The accuracy is defined as a ratio of the instance where an erroneous frame is found in the course of detecting a circular state for 100 erroneous frames in each simulation. Although the accuracy differs according to the transmitted channel and an SNR of each individual channel, if the SNR is high, the accuracy increases to about 50%. In other words, for the burst of 50%, an accurate BQI is obtained by checking the circular state.

TABLE 1

| SNR | Accuracy |
| --- | --- |
| −7.0 | 0.48 (48/100) |
| −6.0 | 0.46 (46/100) |
| −5.0 | 0.57 (57/100) |
| −4.0 | 0.64 (64/100) |

TABLE 2

| SNR | Accuracy |
| --- | --- |
| −4.0 | 0.47 (47/100) |
| −2.0 | 0.48 (48/100) |
| 0.0 | 0.46 (46/100) |
| 2.0 | 0.45 (45/100) |
| 4.0 | 0.49 (49/100) |

The foregoing method can contribute to performance improvement of the FCH burst and obtain an improved BQI. However, about 50% of the FCH burst is determined to be normal, even though it is actually defective.

Therefore, another exemplary embodiment of the present invention provides a method capable of increasing the accuracy of the BQI value for the FCH burst decoding result using a specific bit pattern in the FCH burst. In addition, another exemplary embodiment of the present invention provides a BQI acquisition method for allowing the terminal not to perform the unnecessary DL-MAP decoding process.

With reference to FIG. 6C, a description will now be made of an operation of a receiver in an OFDMA mobile communication system according to another exemplary embodiment of the present invention.

Referring to FIG. 6C, it is noted as stated above that a signal detector 682 is added to an output of the Viterbi decoder 681 in FIG. 6B. The remaining elements of FIG. 6C, for example first combiner 651, deinterleaver 661 and second combiner 671 are similar to the first combiner 650, deinterleaver 660, and second combiner 670, respectively discussed with reference to FIG. 6B.

The Viterbi decoder 681 stores a decoder's internal memory state S2 in a process of obtaining the first decoded bit in the process of extracting decoded data of the decoding process. The Viterbi decoder 681 stores a decoder's internal memory state S1 in a process of extracting the last decoded bit while performing the process of extracting the next decoded bit. If the memory state values S1 and S2 are not equal to each other in the decoding process of the Viterbi decoder 681, the signal detector 682, regarding it as decoding failure, sets the BQI value with a Least Significant Bit (LSB) value, and delivers the BQI to an upper level. However, if the memory state values S1 and S2 are equal to each other in the decoding process of the Viterbi decoder 681, the signal detector 682 checks again a fixed pattern of a particular bit among the decoded 24 bits. For example, the signal detector 682 checks whether the 4 reserved bits are all '0'. If the pattern of the particular bit is satisfactory, the signal detector 682 sets the BQI value with a MSB value, regarding it as decoding success. Otherwise, the signal detector 682 sets the BQI value with the LSB value and delivers the BQI value to the upper layer.

Figure 12:
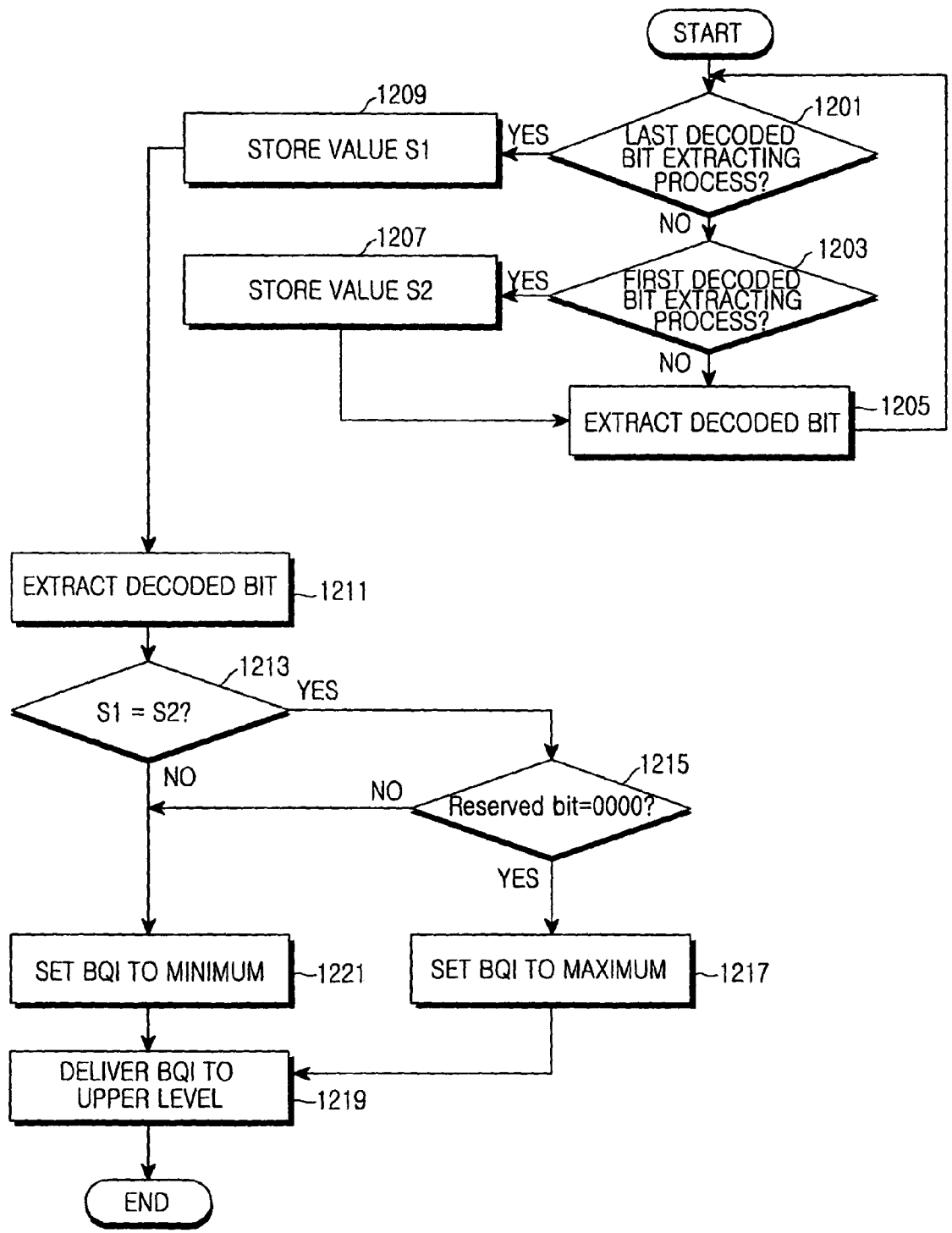
FIG. 12 is a flowchart for a description of an FCH burst decoding method in an OFMDA mobile communication system according to another exemplary embodiment of the present invention.

With reference to FIG. 12, a description will now be made of a decoding method according to another exemplary embodiment of the present invention. FIG. 12 is a flowchart illustrating a method for detecting a BQI using a Viterbi decoding result according to another exemplary embodiment of the present invention.

In step 1201, a Viterbi decoder 681 determines whether the last decoded bit is extracted in the process of extracting decoded data in a decoding process. If the last decoded bit is not extracted, the Viterbi decoder 681 determines in step 1203 whether the first decoded bit is extracted in the process of extracting the decoded data. If the first decoded bit is not extracted, the Viterbi decoder 681 extracts a decoded bit in step 1205, and then returns to step 1201. However, if the first decoded bit is extracted, the Viterbi decoder 681 stores a decoder's internal memory state value S2 in step 1207. Thereafter, the Viterbi decoder 681 extracts the decoded bit in step 1205, and then returns to step 1201.

If the last decoded bit is extracted in the process of extracting the decoded data in step 1201, the Viterbi decoder 681 stores a decoder's internal memory state value S1 in step 1209.

That is, the Viterbi decoder 681 stores the decoder's internal memory state value S2 in the process of obtaining the first decoded bit in the process of extracting the decoded data of the decoding process. In addition, the Viterbi decoder 681 stores the decoder's internal memory state value S1 in the process of obtaining the last decoded bit while performing the process of extracting the next decoded bit in step 1211. It should be noted that the order of obtaining decoded bits and the order of the decoded data's internal bits differ according to an algorithm applied to the decoding process.

After obtaining the last decoded bit, a signal detector 682 compares the two memory state values S1 and S2 stored in the decoder in step 1213 to determine whether they are equal to each other. If the values S1 and S2 are equal to each other, the signal detector 682 determines in step 1215 whether a specific bit in the decoding result has a pattern. For example, the signal detector 682 determines whether the reserved bits are all '0'. If there is a specific pattern, the signal detector 682 sets a BQI value to a maximum value in step 1217, considering that the decoding is made successfully. FCH burst information includes a part in which a pattern of a specific bit is fixed, and another part in which the pattern of the specific bit is not fixed. For example, 4 reserved bits are inserted, and they are all fixed to '0' according to the current 802.16e standard. Because the 802.16e standard is closed, there is almost no possibility that the reserved bits will suffer a change. Therefore, after completing the decoding process, the signal detector 682 checks a value of the fixed part in the 24-bit decoded FCH burst information, thereby contributing to improvement in the accuracy of the FCH burst BQI.

After setting the BQI value to the maximum value, the signal detector 682 delivers the BQI value to an upper level in step 1219, then the Viterbi decoder 681 ends the decoding process.

However, if the two memory state values S1 and S2 stored in the Viterbi decoder 681 are not equal to each other in step 1213, the signal detector 682 sets the BQI value to the minimum value in step 1221, considering that the decoding is failed. Thereafter, in step 1219, the signal detector 682 delivers the BQI value to the upper layer, then the Viterbi decoder 681 ends the decoding process.

Table 3 and Table 4 below show the BQI of the FCH burst, measured in the method proposed by another exemplary embodiment of the present invention. In each given SNR situation, a measurement was made on the ratio that decoding failure was determined for 100 FCH decoding-failed FCH bursts. As a result of the simulation, it has an accuracy of 90% or higher. Therefore, the possible accuracy increases to 90% from 50% for the case where only the circular state is simply verified. As a result, the decoding apparatus reduces the probability that it will perform the next process, regarding the FCH decoding failure as the decoding success. In addition, it is possible to reduce the time and power consumption required for the wrong DL-MAP decoding process possibly performed when there is an error in the DL-MAP length and repetition type information corresponding to the DL-MAP information in the FCH burst information.

TABLE 3

| SNR | Accuracy |
|---|---|
| −7.0 | 0.93 (93/100) |
| −6.0 | 0.91 (91/100) |
| −5.0 | 0.88 (88/100) |

TABLE 4

| SNR | Accuracy |
|---|---|
| −4.0 | 0.96 (96/100) |
| −2.0 | 0.98 (98/100) |
| 0.0 | 0.90 (90/100) |
| 2.0 | 0.93 (93/100) |

As can be understood from the foregoing description, the OFDMA mobile communication system according to an exemplary embodiment of the present invention combines outputs of the deinterleaver using the characteristic of the tail-bited convolutional coder applied to the FCH burst, and delivers the combined result to an input of the decoder, thereby obtaining a performance gain of the FCH burst due to the combining.

In addition, in the OFDMA mobile communication system according to an exemplary embodiment of the present invention, the number of inputs of the Viterbi decoder is halved from the conventional one, facilitating the fast decoding compared to the conventional technology.

Further, exemplary embodiments of the present invention accurately determine the success in FCH decoding, thereby reducing the possibility that it will perform the next process, regarding the failure as the success. As a result, it is possible to reduce the hardware power consumption and time delay.

Moreover, exemplary embodiments of the present invention use a pattern of a specific bit in the FCH burst decoding result, contributing to an increase in accuracy of the BQI value for the FCH burst decoding result.

Besides, exemplary embodiments of the present invention allow the terminal not to perform the unnecessary DL-MAP decoding process, thereby contributing to a reduction in the hardware power consumption and time delay.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks and optical storage devices. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and the full scope of equivalents thereof.

What is claimed is:

1. A decoding apparatus in an Orthogonal Frequency Division Multiple Access (OFDMA) mobile communication system, the apparatus comprising:
    a first combiner for performing first combining on an input burst a first number of times;
    a deinterleaver for deinterleaving an output of the first combiner and outputting a burst having a repeated structure;
    a second combiner for performing second combining on the burst having the repeated structure a second number of times; and
    a decoder for decoding the combined burst.

2. The decoding apparatus of claim 1, wherein the burst is a frame control header (FCH).

3. The decoding apparatus of claim 1, further comprising a signal detector for storing a second internal memory state value of the decoder for an instance where a first decoded bit is extracted from the decoded data, storing a first internal memory state value of the decoder for an instance where a last decoded bit is extracted from the decoded data, comparing the first and the second stored internal memory state values of the decoder, and setting a burst quality indicator (BQI) according to the comparison result.

4. The decoding apparatus of claim 3, wherein the burst is a frame control header (FCH).

5. The decoding apparatus of claim 3, wherein the signal detector sets the BQI to a value indicating that the decoding is successful if the first and second stored internal memory state values of the decoder are equal to each other.

6. The decoding apparatus of claim 5, wherein the signal detector delivers the BQI being set to the value indicating that the decoding is successful to an upper layer.

7. The decoding apparatus of claim 3, wherein the signal detector determines whether a pattern of a specific bit is fixed if the stored internal memory state values of the decoder are equal to each other; and
   sets the BQI to a value indicating that the decoding is successful if the pattern of a specific bit is fixed.

8. The decoding apparatus of claim 7, wherein the signal detector sets the BQI to a value indicating that the decoding is failed if the pattern of a specific bit is not fixed.

9. The decoding apparatus of claim 3, wherein the signal detector sets the BQI to a value indicating that the decoding is failed if the first and second stored internal memory state values of the decoder are not equal to each other.

10. A decoding method in an Orthogonal Frequency Division Multiple Access (OFDMA) mobile communication system, the method comprising the steps of:
    performing first combining on an input burst a first number of times;
    deinterleaving the first-combined burst and outputting a burst having a repeated structure;
    performing second combining on the burst having the repeated structure a second number of times; and
    decoding the second-combined burst.

11. The decoding method of claim 10, wherein the burst is a frame control header (FCH).

12. The decoding method of claim 10, further comprising the steps of:
    storing a second internal memory state value of a decoder for an instance where a first decoded bit is extracted from the decoded data;
    storing a first internal memory state value of the decoder for an instance where a last decoded bit is extracted from the decoded data;
    comparing the first and second stored internal memory state values of the decoder; and
    setting a burst quality indicator (BQI) according to the comparison result.

13. The decoding method of claim 12, wherein the burst is a frame control header (FCH).

14. The decoding method of claim 12, further comprising the step of setting the BQI to a value indicating that the decoding is successful if the first and second stored internal memory state values of the decoder are equal to each other.

15. The decoding method of claim 14, further comprising the step of delivering the BQI being set to the value indicating that the decoding is successful to an upper layer.

16. The decoding method of claim 12, further comprising the step of setting the BQI to a value indicating that the decoding is failed if the first and second stored internal memory state values of the decoder are not equal to each other.

17. The decoding method of claim 16, further comprising the step of setting the BQI to a value indicating that the decoding is failed if the pattern of a specific bit is not fixed.

18. The decoding method of claim 12, further comprising the steps of:
    determining whether a pattern of a specific bit is fixed if the first and second stored internal memory state values of the decoder are equal to each other; and
    setting the BQI to a value indicating that the decoding is successful if the pattern of a specific bit is fixed.

19. A computer-readable medium having stored thereon instructions for executing a decoding method in an Orthogonal Frequency Division Multiple Access (OFDMA) mobile communication system, the instructions comprising:
    a first set of instructions for performing first combining on an input burst a first number of times;
    a second set of instructions for deinterleaving the first-combined burst and outputting a burst having a repeated structure;
    a third set of instructions for performing second combining on the burst having the repeated structure a second number of times; and
    a fourth set of instructions for decoding the second-combined burst.

20. A decoding apparatus in an Orthogonal Frequency Division Multiple Access (OFDMA) mobile communication system, the apparatus comprising:
    a decoder for decoding input data; and
    a signal detector for storing a second internal memory state value of the decoder for an instance where a first decoded bit is extracted from the input data, storing a first internal memory state value of the decoder for an instance where a last decoded bit is extracted from the input data, comparing the first and the second stored internal memory state values of the decoder, and determining whether the decoding is successful or failed according to the comparison result.

21. The decoding apparatus of the claim 20, wherein the input data is encoded by way of tail-bited encoding.

22. The decoding apparatus of the claim 21, wherein the input data is a frame control header (FCH).

23. The decoding apparatus of the claim 22, wherein the decoder ceases a decoding of a DL_MAP when the decoding of the FCH is failed.

24. A decoding method in an Orthogonal Frequency Division Multiple Access (OFDMA) mobile communication system, the apparatus comprising:
    decoding input data; and
    storing a second internal memory state value of the decoder for an instance where a first decoded bit is extracted from the input data;
    storing a first internal memory state value of the decoder for an instance where a last decoded bit is extracted from the input data;
    comparing the first and the second stored internal memory state values of the decoder; and
    determining whether the decoding is successful or failed according to the comparison result.

25. The decoding method of the claim 24, wherein the input data is encoded by way of tail-bited encoding.

26. The decoding method of the claim 25, wherein the input data is a frame control header (FCH).

27. The decoding method of the claim 26, further comprising the steps of ceasing a decoding a decoding of a DL_MAP when the decoding of FCH is failed.

* * * * *